(12) United States Patent
Kornbluth et al.

(10) Patent No.: US 11,815,945 B2
(45) Date of Patent: Nov. 14, 2023

(54) EFFICIENT SCALING OF NEURAL-NETWORK INTERATOMIC POTENTIAL PREDICTION ON CPU CLUSTERS

(71) Applicant: Robert Bosch GmbH, Stuttgart (DE)

(72) Inventors: Mordechai Kornbluth, Brighton, MA (US); Jonathan Mailoa, Cambridge, MA (US)

(73) Assignee: Robert Bosch GmbH, Stuttgart (DE)

(*) Notice: Subject to any disclaimer, the term of this patent is extended or adjusted under 35 U.S.C. 154(b) by 637 days.

(21) Appl. No.: 17/037,417

(22) Filed: Sep. 29, 2020

(65) Prior Publication Data

US 2022/0100931 A1 Mar. 31, 2022

(51) Int. Cl.
| | |
|---|---|
| G06F 30/20 | (2020.01) |
| G06F 30/27 | (2020.01) |
| G06F 30/25 | (2020.01) |
| G06N 3/084 | (2023.01) |
| G06V 10/75 | (2022.01) |
| G06F 18/20 | (2023.01) |
| G06F 18/21 | (2023.01) |

(52) U.S. Cl.
CPC .......... *G06F 30/27* (2020.01); *G06F 18/2163* (2023.01); *G06F 18/29* (2023.01); *G06F 30/25* (2020.01); *G06N 3/084* (2013.01); *G06V 10/751* (2022.01)

(58) Field of Classification Search
CPC ...... G06F 30/27; G06F 18/2163; G06F 18/29; G06F 30/25; G06F 2111/02; G06N 3/084; G06N 3/045; G06V 10/751; G06V 10/82
See application file for complete search history.

(56) References Cited

U.S. PATENT DOCUMENTS

| | | | | |
|---|---|---|---|---|
| 2008/0147360 A1* | 6/2008 | Fejes | ...................... | G16B 15/00 |
| | | | | 703/2 |
| 2012/0150512 A1* | 6/2012 | Takai | ...................... | G16C 10/00 |
| | | | | 703/2 |
| 2019/0272468 A1* | 9/2019 | Feinberg | ................ | G16B 15/30 |

FOREIGN PATENT DOCUMENTS

| | | | |
|---|---|---|---|
| CN | 101685530 A | * | 3/2010 |
| CN | 101727512 A | * | 6/2010 |

(Continued)

OTHER PUBLICATIONS

Bratholm et al., A Community-Powered Search of Machine Learning Strategy Space to Find NMR Property Prediction Models, arXiv:2008.05994 (2020).

(Continued)

*Primary Examiner* — Kandasamy Thangavelu
(74) *Attorney, Agent, or Firm* — Brooks Kushman P.C.

(57) ABSTRACT

Element simulation is described using a machine learning system parallelized across a plurality of processors. A multi-element system is partitioned into a plurality of partitions, each partition including a subset of real elements included within the partition and ghost elements outside the partition influencing the real elements. For each processor of the plurality of processors, force vectors are predicted for the real elements within the multi-element system by making a backward pass through a graph neural network (GNN) having multiple layers and parallelized across multiple processors, the predicting including adjusting neighbor distance separately for each of the multiple layers of the GNN. A physical phenomenon is described based on the force vectors.

19 Claims, 10 Drawing Sheets

(56) References Cited

FOREIGN PATENT DOCUMENTS

| CN | 102053945 A | * | 5/2011 | | |
|---|---|---|---|---|---|
| CN | 110097927 A | * | 8/2019 | ............. | G16C 20/30 |
| WO | WO 2011021279 A1 | * | 2/2011 | ............. | G16C 10/00 |

OTHER PUBLICATIONS

Mailoa et al., Fast Neural Network Approach for Direct Covariant Forces Prediction in Complex Multi-Element Extended Systems, Nat. Mach. Intell. (2019).
Park et al., Accurate and Scalable Multi-Element Graph Neural Network Force Field and Molecular Dynamics With Direct Force Architecture, arXiv:2007.14444 (2020).
Schutt et al., SchNet: A Continuous-Filter Convolutional Neural Network for Modeling Quantum Interactions, Advances in Neural Information Processing Systems 30 (NIPS 2017).

* cited by examiner

EFFICIENT SCALING OF NEURAL-NETWORK INTERATOMIC POTENTIAL PREDICTION ON CPU CLUSTERS

TECHNICAL FIELD

Aspects of the disclosure generally relate scaling molecular dynamics simulations using a neural-network force field (NNFF) across multiple CPUs, which each have limited knowledge of all atoms in the system.

BACKGROUND

Molecular dynamics (MD) is a computational materials science methodology for simulating the motion of atoms in a material system at real operating pressure and temperature conditions. Methodologies exist to calculate the underlying atomic forces used in the simulation of the motion of atoms. One methodology is the ab-initio quantum mechanics approach. This approach is very accurate but is also very expensive because of the tremendous amount of computational resources necessary to apply the approach. While other approaches exist that consume less computational resources, these other approaches do not deliver as much accuracy.

SUMMARY

According to one or more illustrative examples, a computational method is described for element simulation using a machine learning system parallelized across a plurality of processors. A multi-element system is partitioned into a plurality of partitions, each partition including a subset of real elements included within the partition and ghost elements outside the partition influencing the real elements. For each processor of the plurality of processors, force vectors are predicted for the real elements within the multi-element system using a graph neural network (GNN) having multiple layers and parallelized across multiple processors, the predicting including adjusting neighbor distance separately for each of the multiple layers of the GNN. A physical phenomenon is described based on the force vectors.

According to one or more illustrative examples, a computational system for element simulation using a machine learning system parallelized across a plurality of processors is described. The system includes a plurality of processing nodes, each node including a memory storing instructions of a GNN algorithm of molecular dynamics (MD) software and a processor programmed to execute the instructions to perform operations. The operations include to operate on one of a plurality of partitions, each partition including a subset of real elements included within the partition and ghost elements outside the partition influencing the real elements; predict force vectors for the subset of real elements included within the partition by making a backward pass through a GNN having multiple layers and parallelized across the plurality of processing nodes, the predict operation including to adjust neighbor distance separately for each of the multiple layers of the GNN; and describe a physical phenomenon based on a combination of the force vectors from the plurality of processing nodes.

According to one or more illustrative examples, a non-transitory computer-readable medium includes instructions to be executed by a plurality of processing nodes of a parallelized machine learning system. When executed, the instructions cause the system to perform operations including to operate on one of a plurality of partitions, each partition including a subset of real elements included within the partition and ghost elements outside the partition influencing the real elements; predict force vectors for the subset of real elements included within the partition by making a backward pass through a GNN having multiple layers and parallelized across the plurality of processing nodes, the predict operation including to adjust neighbor distance separately for each of the multiple layers of the GNN; and describe a physical phenomenon based on a combination of the force vectors from the plurality of processing nodes.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Molecular dynamics (MDs) methodologies are beneficial for studying physical phenomena, such as, but not limited to, ionic transport, chemical reactions, and material bulk and surface degradation in material systems, such as, devices or functional materials. Non-limiting examples of such material systems include fuel cells, surface coatings, batteries, water desalination, and water filtration Methodologies exist to calculate the underlying atomic forces used in the simulation of the motion of atoms. For example, ab-initio quantum mechanics approach can be accurate but can also be expensive in terms of computing resources because of the tremendous amount of computational resources necessary to apply the approach.

Neural networks have been utilized to fit and predict quantum mechanics energies. These methodologies have been referred to as neural network force fields (NNFF). Negative derivatives of energy with respect to atomic positions (atomic forces) are predicted using quantum mechanics energies. However, these methodologies are also computationally expensive. In light of the foregoing, what is desirable is a computational methodology for calculating atomic forces that delivers an adequate level of accuracy while consuming a reasonable amount of computing resources.

Molecular dynamics use atomic positions (and possibly charges, bonds, or other structural information) to calculate interatomic forces of each atom, which are consequently used to modify the velocities of atoms in the simulation. The resulting trajectories of the atoms are utilized to describe physical phenomena, such as, but not limited to, ionic transport motion in batteries (e.g., Li-ion batteries) and fuel cells (e.g., fuel cell electrolyte), chemical reactions during bulk and surface material degradation, solid-state material phase change, molecular binding and protein folding for instance for drug design, biosciences, and biochemistry design.

Material properties are governed by their atoms and interactions. For many properties, the length scale and time scale of interest is accessible by MD simulations, which is a simulation that predicts the motion of individual atoms. These simulations include the following setup: (i) obtain the atomic positions; (ii) calculate forces based on the atomic positions; (iii) update velocities based on the forces as calculated; (iv) update the atomic positions based on velocities; and (v) repeat as desired.

To compute the forces, a tradeoff may occur between accuracy and computation speed. The most accurate methods for atomic forces consider the electronic structure of the system, such as ab-initio density functional theory (DFT). These simulations are known as ab-initio molecular dynamics (AIMD). These methods typically scale as $N^3$, where N is the number of atoms in the system, although tight-binding methods may scale as little as N and coupled-cluster methods may scale as much as $N^7$. Nonetheless, these calculations are typically expensive, leaving a desire for more efficient calculation methods. Due to the memory and computational load, such calculations are currently limited to ~500 atoms for ~1 nanosecond of simulation.

On the other hand, classical molecular dynamics models entirely neglect the electrons, substituting their effect with a generalized interatomic force generation function. These are typically simple functions such as Lennard-Jones, Buckingham, Morse, etc. that capture binding strength and distance approximately, but often fail to describe the materials properties adequately. Some groups attempt to add complexity to these models, e.g., ReaxFF and charge equilibration schemes, to balance accuracy and computation cost.

Machine-learning interatomic potentials may be used a solution with first-principles accuracy yet faster calculation time. Deep neural networks are a particularly popular choice, due to the large parameter space being able to fit a wide range of data. The general training scheme is as follows: (i) define a neural-network architecture; (ii) generate first-principles data via DFT calculations or the like; (iii) train the neural-network parameters on the first-principles data; and (iv) use the trained neural network to predict forces in an MD simulation.

With respect to aspect (i), the various architectural choices may be made in the definition of the neural network. In an example, the neural network may account for Behler-Parinello features, which are hardcoded into the model. In another example, a graph convolutional network or graph neural network (GNN) may be implemented, where each atom and bond is an element of a graph, and messages are passed between them. As yet a further example, a hyper-graph transformer model may be utilized, where atoms and bonds are elements of a graph, and the messages are passed through a transformer "attention" architecture, weighting closer atoms over farther atoms.

With respect to aspect (iv), various choices may also be made in the approach to computing forces. In an example, a direct-prediction model may be utilized, in which the forces are predicted without necessarily being a negative gradient of a scalar energy. As another possibility, an autogradient model may be used, in which the model predicts the total energy, and uses an autograd (automatic differentiation) algorithm to compute the forces as the negative gradient of the energy with respect to atomic positions.

Figure 1:
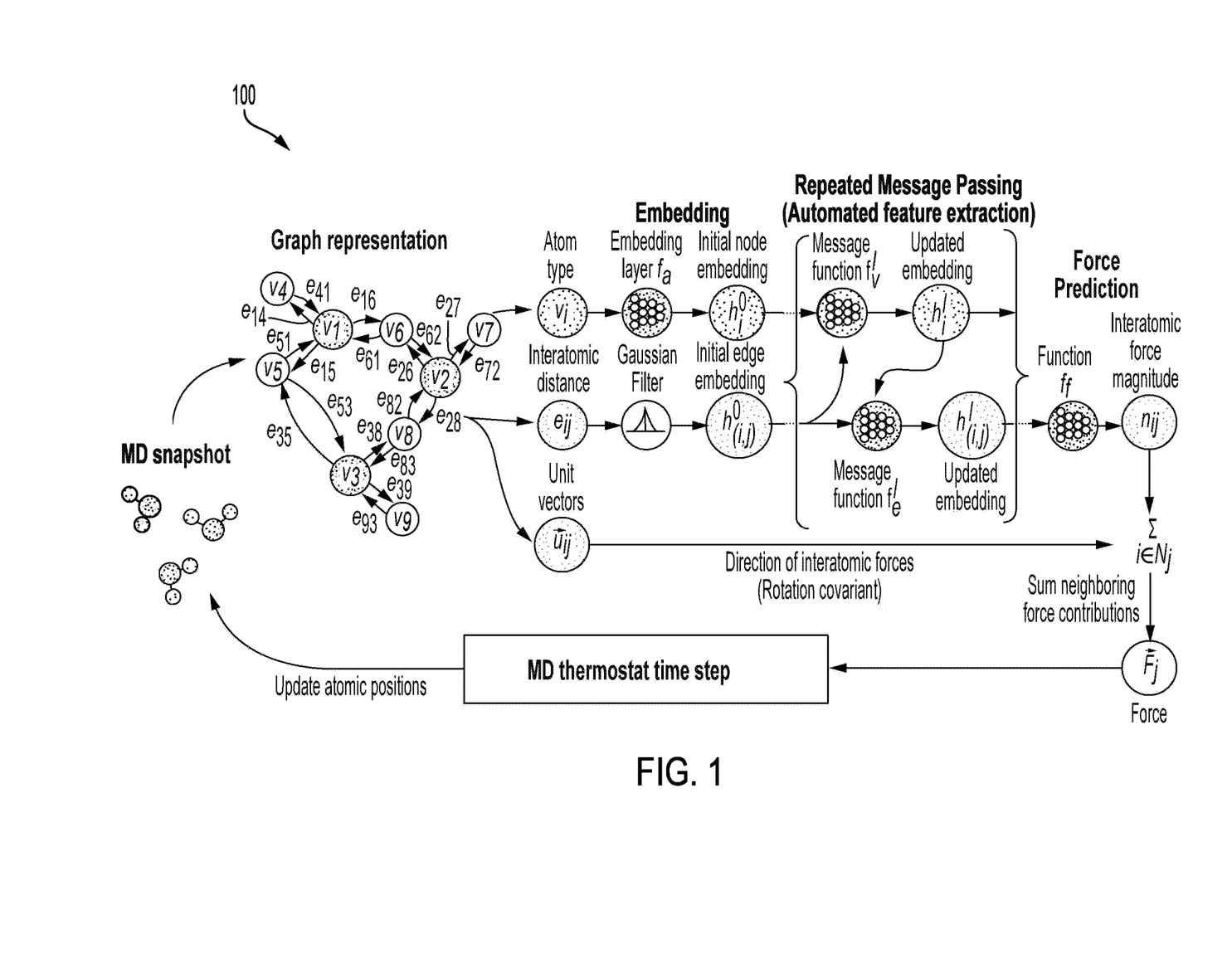
FIG. 1 illustrates an example of a GNN force-field with direct-force prediction.

FIG. 1 describes an example graph-neural-network (GNN) 100 with direct-force prediction. In the illustrated example GNN 100, atomic positions are mapped onto a graph with nodes (v) and edges (e). Then, key features, such as atom chemical type and distances, are extracted (rotationally invariant), and sent to a message-passing routine. The unit vectors are also extracted and provide weights to ensure the final forces are rotationally covariant (i.e., transforming the atoms through a rotation will transform the forces accordingly). The force predictor is coupled to a thermostat to ensure that the lack of energy-conservation does not result in accumulation of heat. Accordingly, the thermostat is configured to add or subtract kinetic energy appropriately.

Figure 2:
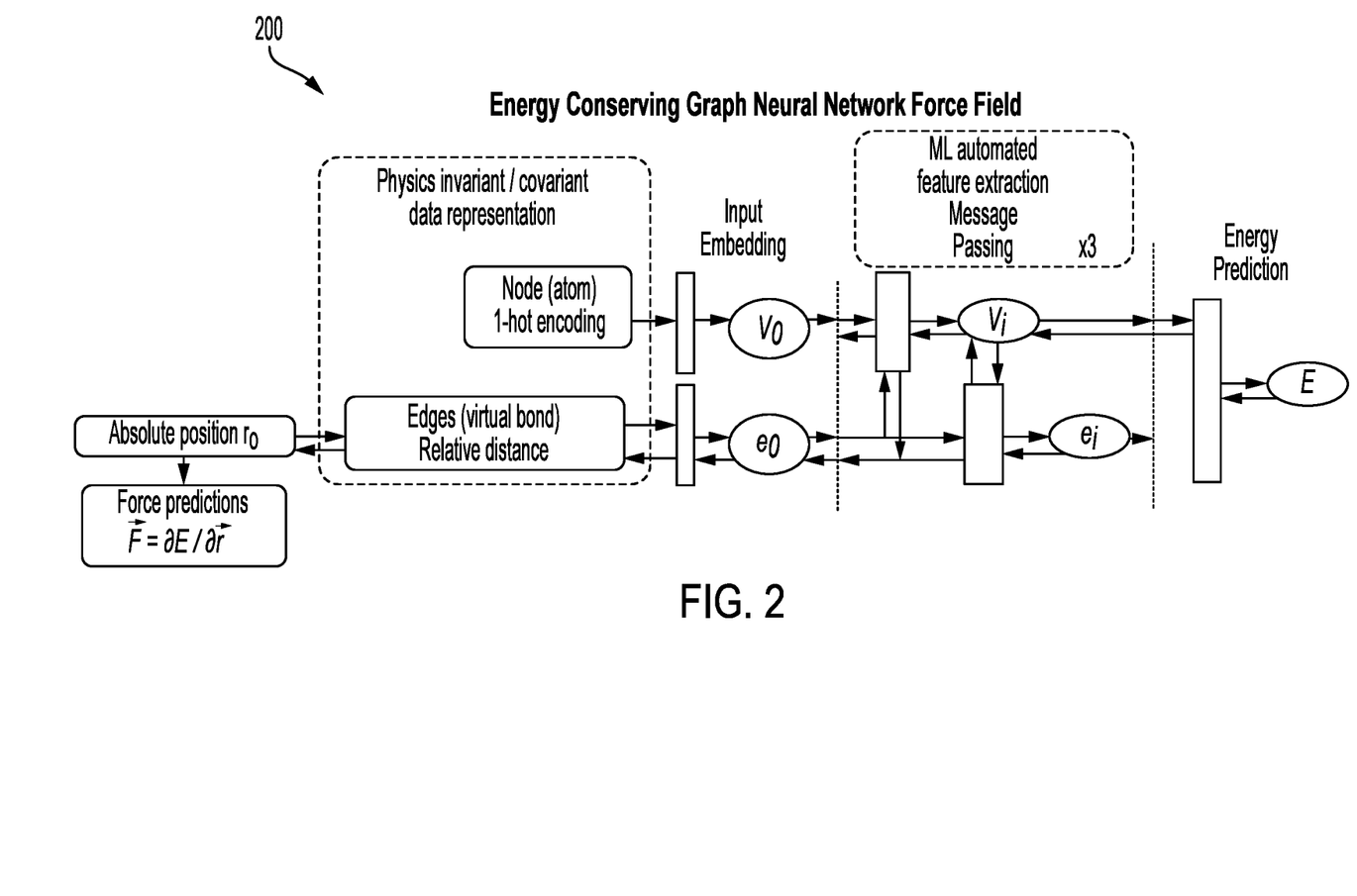
FIG. 2 illustrates an example architecture of an autogradient graph neural network (GNN) scheme.

FIG. 2 illustrates an example architecture 200 of an autogradient GNN scheme that contains autogradient forces. In such an approach, the input to the neural network is the position of each atom $r_0$, as well as any other relevant information. The output of the final layer is summed to produce a prediction for the energy E of the molecule. The derivative $\partial E/\partial r_i$ may then be calculated, where its negative $-\partial E/\partial r_i$ may be used as the prediction of the force acting on atom i. Provided that the neural network total energy is a smooth function of the set of positions $\{r_0\}$, the derivatives $\partial E/\partial r_i$ are guaranteed to conserve energy.

Here the forward arrows convey a prediction of the force, and the backward arrows convey the autogradient function that is used to predict the forces, a gradient of the energy with respect to absolute positions. The backward pass through the network iteratively calculates derivatives at each layer, to calculate $\partial E/\partial r_i$ for each i; and return forces predictions $F_i := -\partial E/\partial r_i$.

The GNN may be trained as a deep neural network. For instance, a loss function L may be formed to compare the force predictions $\partial E/\partial r_i$ to ground truth forces on a labeled dataset, and the network weights may then be optimized with respect to this loss using gradient descent. Because the gradient descent is being performed on a gradient, this requires the computation of higher-order derivatives; each training iteration will thus take approximately twice as long as a feedforward neural network.

This is a relatively more expensive method than shown in FIG. 1, because it requires one derivative for prediction and two for training, as opposed to the direct-force model that requires no derivatives for prediction and one for training. However, it is more accurate in that the thermostat of the GNN is not strictly necessary, and the force is guaranteed to be a derivative of a scalar energy field, in addition to being rotationally covariant.

Turning to aspect (iv), using the trained neural network to predict forces in an MD simulation, further optimization may be performed. For a relatively small simulation (<500 atoms), it is feasible to use a GPU for force prediction just as one does for training. However, for larger systems, the prediction of the neural network for many atoms does not fit on the GPU due to memory limitations. Typical hardware architectures have one GPU per node, or perhaps for national clusters several GPUs per node, but batching the prediction to a few hundred atoms at a time limits the scalability of the network. Thus, it is desirable to define an approach for a more efficient way to predict forces on a CPU. Deep neural networks are typically slow on CPUs, because the key operation of matrix multiplication is not as efficiently parallelized. Nonetheless, GPU batch sizes are typically 10-50 atoms (depending on the size of the network), so at >100-500 atoms even a 10x slowdown by using CPU makes parallelized CPU more efficient than a single GPU.

Even for classical potentials, scaling MD simulations across multiple CPUs is a well-investigated problem. One such solution is the Large-scale Atomic/Molecular Massively Parallel Simulator (LAMMPS). LAMMPS operates by distributing atoms across multiple CPUs by assigning each CPU the ownership of any atoms within a volume in physical space (e.g., a 2×2×3 nm cube). Instead of retaining information about every atom in the system, the CPU only operates on information regarding the atoms within its corresponding volume plus those atoms adjacent to the volume. LAMMPS utilizes various algorithms to identify the atomic neighbors (referred to as neighbor lists) for each CPU. These atomic neighbors include ghost atoms, which refers to atoms that are owned by a different CPU but are close enough to require the CPU itself to have information about its position. With this information, the forces can be predicted individually on each CPU, with minimal communication between CPUs only when atoms move from the ownership (i.e., the computational domain) of one CPU to that of another CPU.

Aspects of the disclosure relate to one or more methods, and the hardware that performs these methods, that enable molecular-dynamics simulations on a CPU. These simulations may be used to describe physical phenomena, which can allow for the design of new materials, such as those in fuel cells, batteries, sensors, etc. As noted above, the simulations may utilize techniques such as GNNs. These methods have tradeoffs in accuracy, but the training process itself has an error typically on the order of 100 meV/A in the force prediction, and the DFT methods themselves have errors on the order of 10-100 meV/A in the forces, depending on the system in question.

In one illustrative example, the deep neural network uses network quantization, which refers to a method in which floating-point numbers are stored in low-bitwidth forms. This makes the network more efficient to compute on a CPU. This is realizable for direct-force models, but is not realizable for autogradient schemes, because the low-bitwidth forms are not implemented and will accumulate imprecisions when a gradient is taken.

Figure 3:
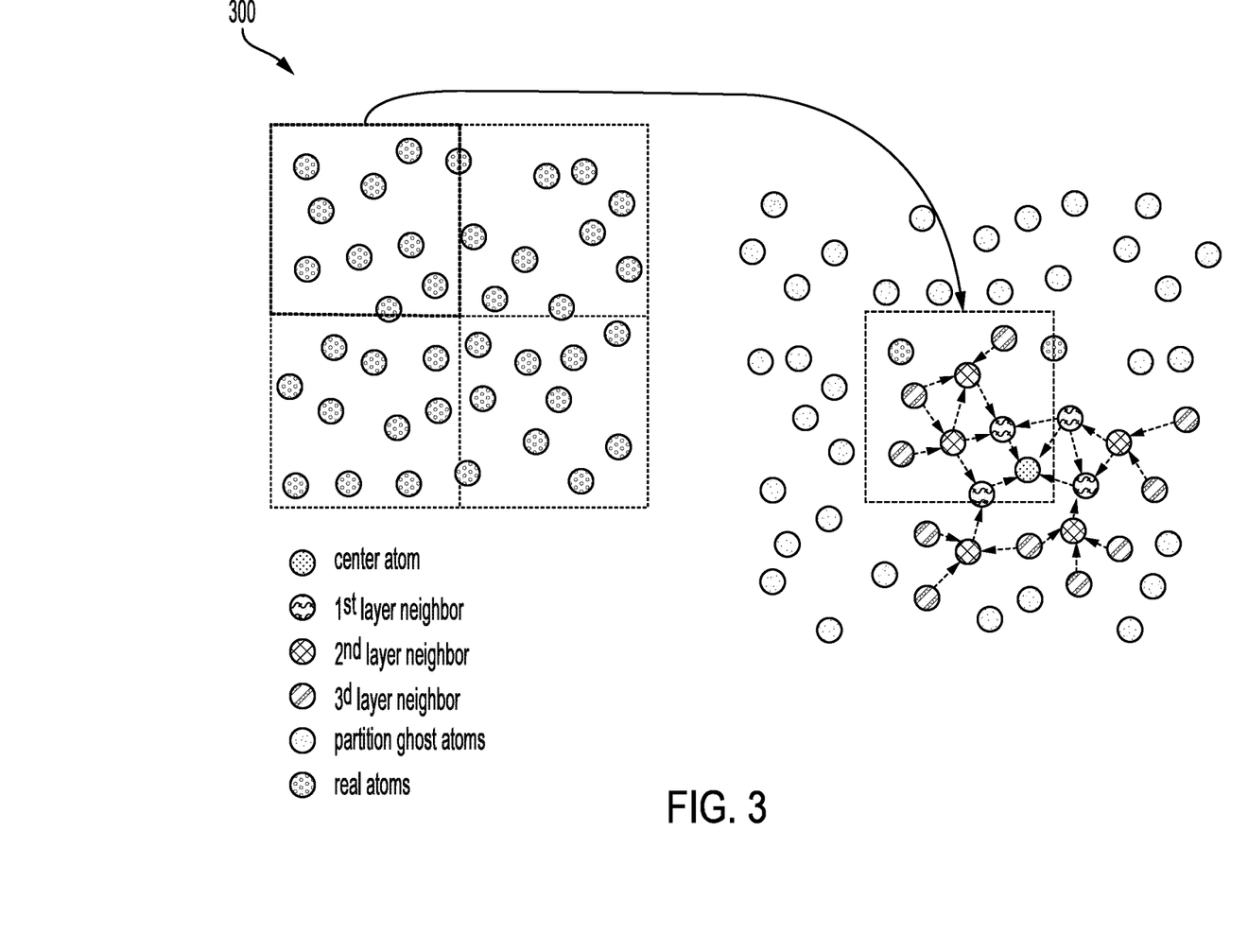
FIG. 3 illustrates an example partition scheme of local and ghost atoms, with neighbor enumeration.

In another illustrative example, the deep neural network contains neighbor architectures that increase compatibility with LAMMPS. A typical deep network contains multiple message-passing routines between atoms, be they convolutions, sigmoids, transformer matrices, etc. For the purposes of example, let us suppose we have three iterations, e.g., three layers in the network, as shown in FIG. 2. Recall that the LAMMPS algorithms split up the atoms between CPUs, with each CPU owning a subset of atoms and additionally containing information about some number of ghost atoms that are necessary to predict the forces on the local atoms. Here is an example:

FIG. 3 illustrates an example partition scheme 300 of local and ghost atoms, with neighbor enumeration. As shown in FIG. 3, the real atoms on the top left are separated into four groupings, each to be executed on a separate processor. Each grouping includes information about the local atoms, i.e., those within the box, and ghost atoms, i.e., those that are close enough the local atoms to substantially affect the forces of the local atoms above the margin of error of the system. The right side shows an image of a particular processor. The processor is aware of the real atoms in its box, and its 1st, 2nd, and 3rd layer neighbors. Therefore, in the example, all neighbors up until the 3rd-layer neighbors of every local atom are available to this processor; the other ghost atoms can be safely ignored.

Figure 4:
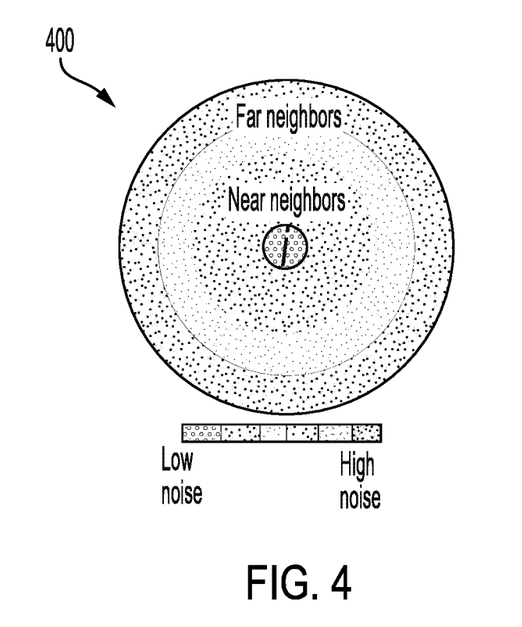
FIG. 4 illustrates an example schematic of noise as a function of distance from the central atom i.

FIG. 4 illustrates an example schematic 400 of noise as a function of distance from a central atom i. As shown, the number of ghost atoms scales poorly. If a typical neighbor distance for the network is, e.g., 5 Å (a relatively small amount, given that nearest-neighbor bond lengths are only ~1-2 Å), the ghost atom radius may, for example, include all atoms out to 15 Å (three layers), which increases the number of atoms treated on each processor. The key to fast CPU prediction is to keep the number of atoms as small as possible. This is because each CPU has a limited amount of processing speed and memory, both of which will scale linearly with the number of atoms whose properties need to be computed.

Figure 5:
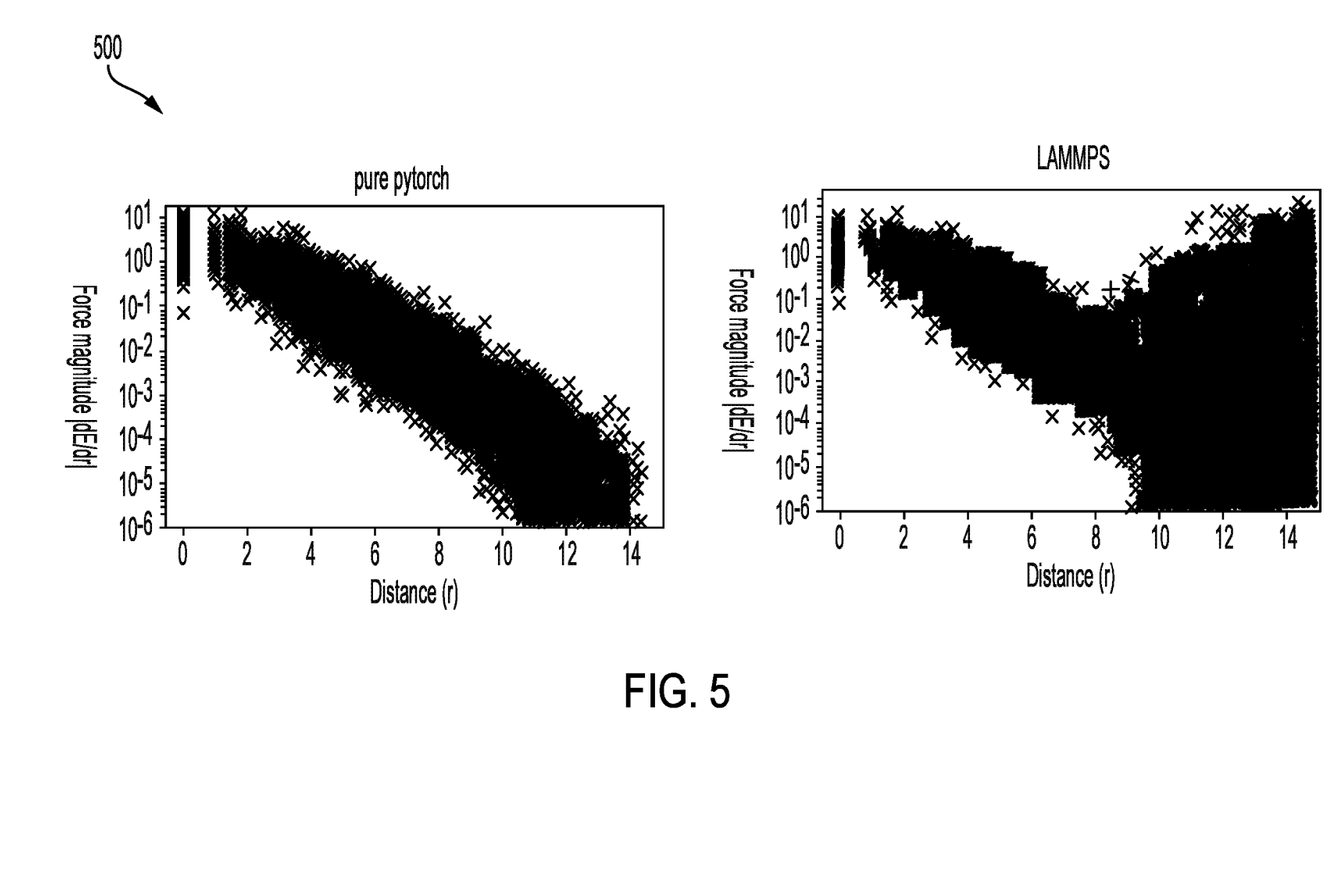
FIG. 5 illustrates an example graph of noise for distant atoms using various approaches.

Moreover, the numerical noise in the force prediction is high for far neighbors, as depicted in FIGS. 4 and 5. Specifically, the autogradient version of the force field (such as shown in FIG. 2) computes the energy of each atom $E_1$ and differentiates it with respect to the absolute positions of each atomic position 4. The total force on central atom i is therefore $\vec{F}_i = -\Sigma_j \partial E_j / \partial \vec{r}_i$. If every position in the system is exactly identified, then the scheme will be as accurate as the neural network can make it. However, if only the aforementioned three layers of ghost atoms are included, $E_j$ will have inaccuracies due to its limited knowledge of its own environment. And if six layers of ghost atoms are used, so that we entirely know the environment of atom j, the computational expense would balloon.

FIG. 5 illustrates an example graph 500 of noise for distant atoms using various approaches. This shows this second point, using an example where noise is shown for distant atoms. In a single system where the position of every atom is exactly known, it can be seen the forces decays with distance, as would be expected. However, in a LAMMPS implementation that consists of limited knowledge per processor, the noise accumulates for distant atoms ($r_{ij} > \sim 8$ Å). This unexpected effect is not described in the literature and presents a significant barrier to the naïve expression $\vec{F}_i = -\Sigma_j \partial E_j / \partial \vec{r}_i$.

To address these two issues, two approaches are provided to the NN architecture. These two approaches may be used to improve the scaling of NN interatomic potential prediction on CPU clusters and are a focus of the remainder of the disclosure.

Figure 6:
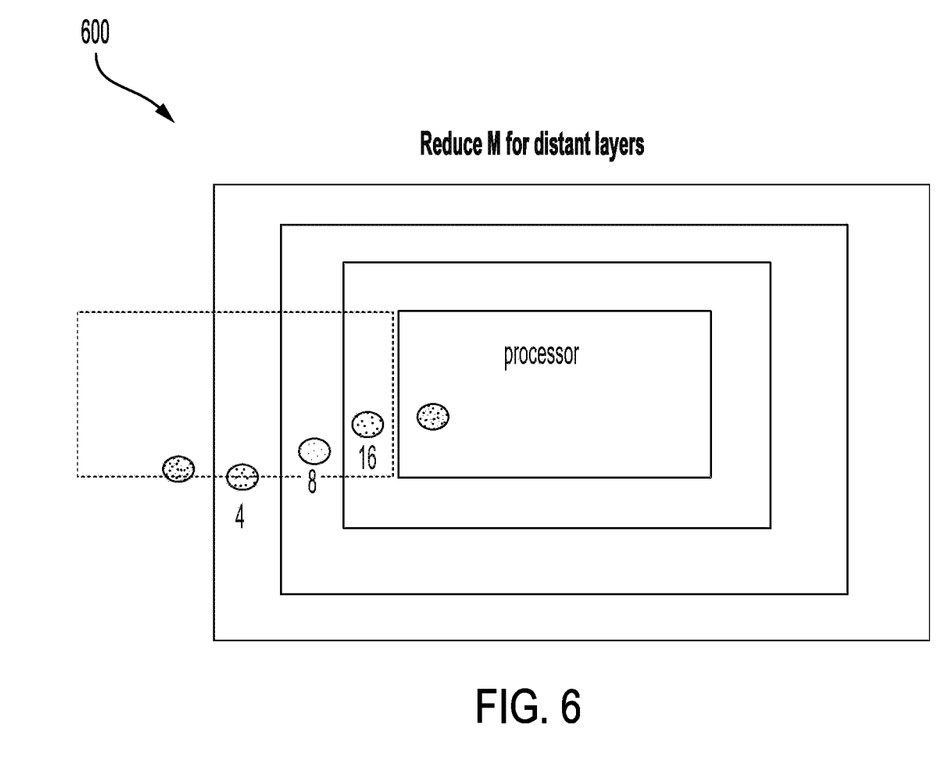
FIG. 6 illustrates an example of reducing a number of neighbors (M) for each layer of a neural network.

First, instead of summing the same number of neighbors for each layer of the network, the neighbor distance is instead adjusted. In one implementation, as shown in the example 600 of FIG. 6, the first layer of the network has only 4 neighbor atoms, the second layer has 8, and the third layer has 16. In other implementations, the scaling can be performed by distance, e.g., the first layer of the network includes bonds within 3 Å, the second within 5 Å, and the third within 7 Å. This has a minimal effect on network accuracy, but a strong effect on prediction speed, for two reasons. First, the prediction speed involves multiplication of matrices that are on the size $O(NM^2)$, where M is the number of neighbors included in the layer and N are the number of atoms in the batch. Therefore, a reduction of M will improve the computation efficiency superlinearly. Second, the ghost atom distance is not needed to be as large, because the farthest atoms whose information needs to migrate to the local processor are significantly closer.

The second approach of the solution is to truncate the summation $\vec{F}_i = -\Sigma_j \partial E_j / \partial \vec{r}_i$. Instead of including every atom j in this summation, only the values of j are included that are within a certain cutoff of the atom i or the processor that contains atom i. As some non-limiting examples, this cutoff may be based on distance (e.g., 3 Å, 5 Å, 7 Å, etc.) and/or quantity of neighbors (e.g., the 16 nearest neighbors). Thus, the noise from far atoms is truncated in the model, significantly improving the accuracy when parallelized across multiple processors.

Figure 7:
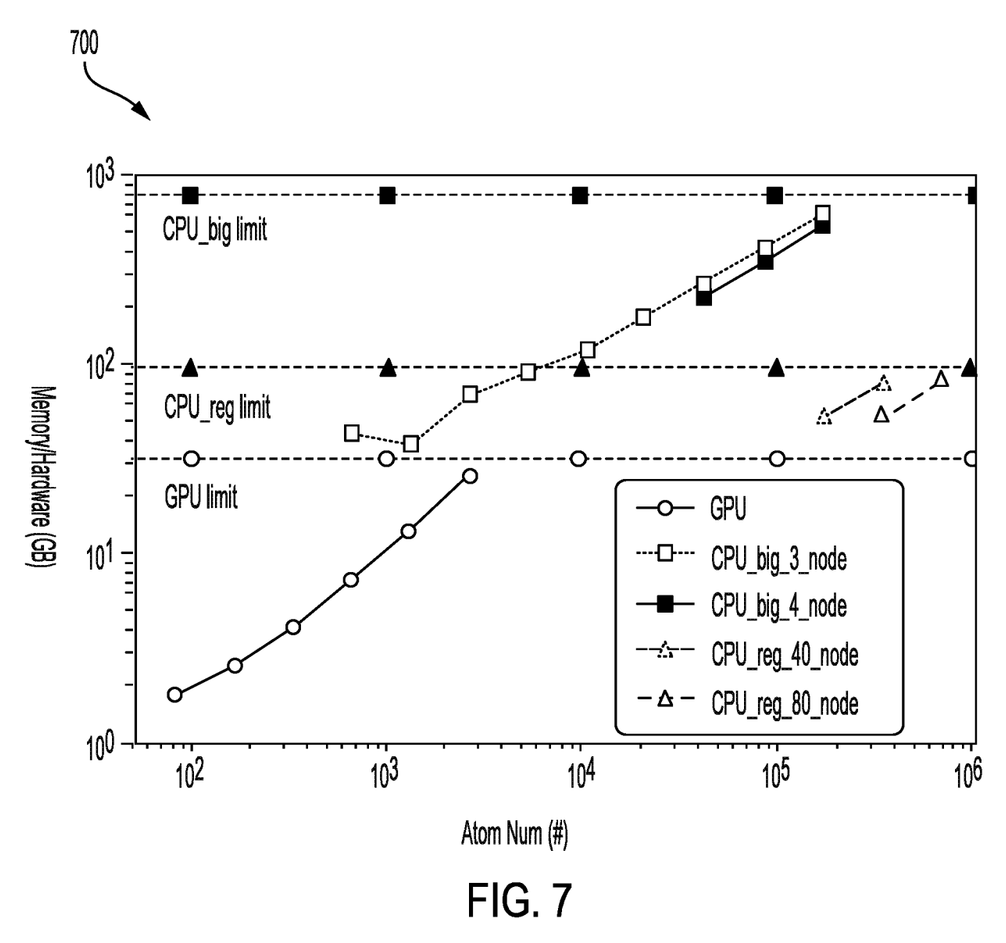
FIG. 7 illustrates an example relation of memory per hardware (GPU or CPU node) requirements for a GNNFF algorithm in a GPU and several different parallel CPU configurations.

FIG. 7 illustrates an example 700 of memory per hardware (GPU or CPU node) requirements for the GNNFF algorithm in a GPU and several different parallel CPU configurations. For the CPU with large memory nodes, 20 cores/node were used. For the CPU with regular memory nodes, 2 cores/node were used. The dotted lines indicate the hard cutoff for the maximum memory available in a given GPU/CPU node.

Thus, the scalability of the parallel CPU algorithm for the GNNFF can be observed. This scalability is shown for a test of a material system of a LiPS superionic conductor. As can be seen in FIG. 7, the memory requirement for the algorithm scales approximately linearly (n=1) for the GPU, but only sub-linear for the parallel CPU (n<1, approximately n~0.6). This increase due to the additional memory overhead for to the usage of the ghost atoms for each of the individual compute cores scales approximately as $n^{2/3}$, which does not scale linearly with the number of atoms while the scaling is still based on increased number of atoms/node. Once the scaling of n is facilitated by increased number of compute cores, the scaling is expected to level off as linear.

Figure 8:
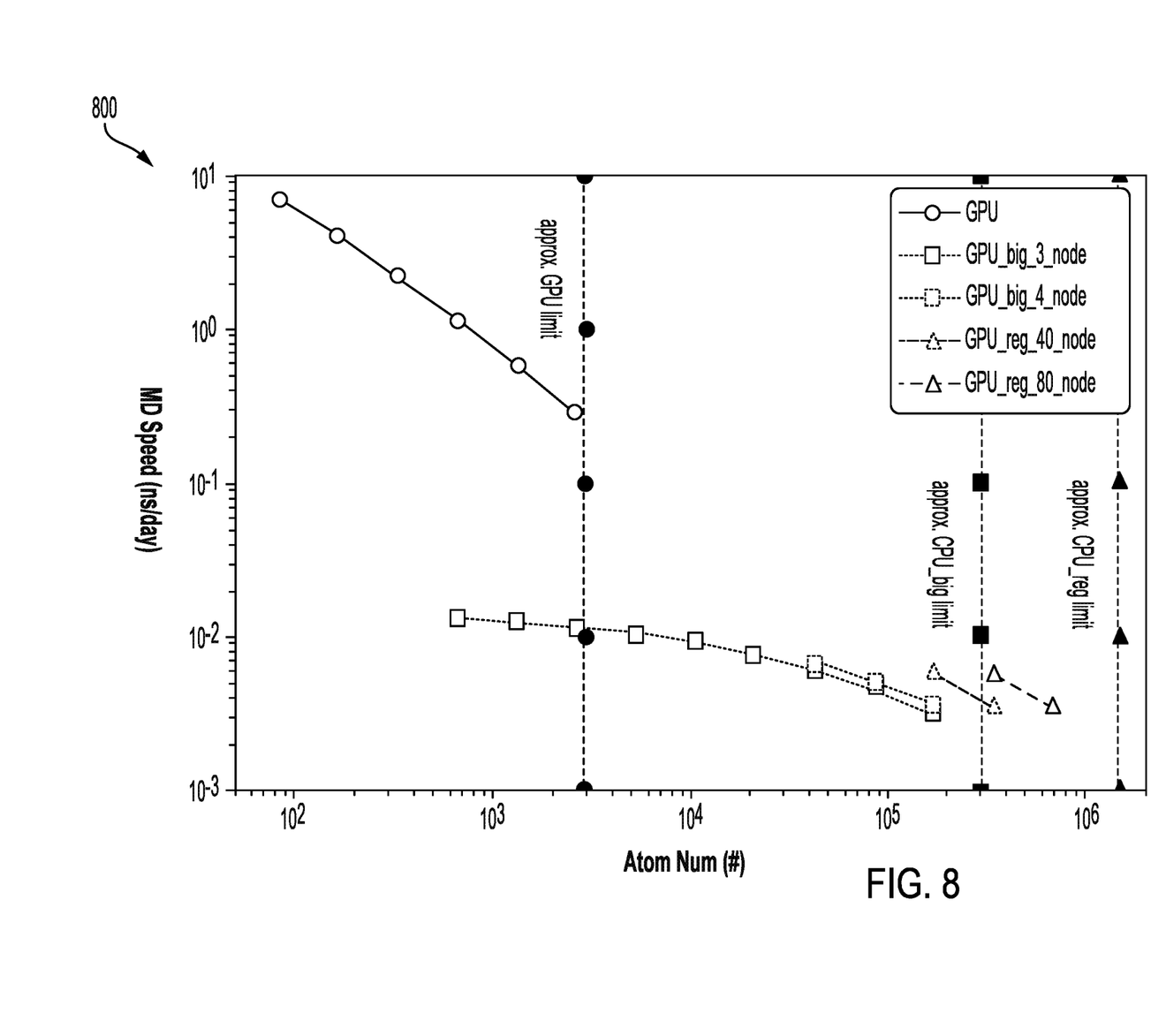
FIG. 8 illustrates an example of molecular dynamic simulation speed vs number of atoms in the simulation, for different GPU and parallel CPU hardware configurations.

FIG. 8 illustrates an example molecular dynamic simulation speed vs number of atoms in the simulation 800, for different GPU and parallel CPU hardware configurations. For the CPU with large memory nodes, 20 cores/node were used. For the CPU with regular memory nodes, 2 cores/node were used. The dotted lines indicate the approximate maximum number of atoms we can do in the different hardware configurations available. Logically, the speed of the simulation is affected by the number of atoms. While the MD speed falls with the increased number of atoms (n=-1), the MD speed of the parallel CPU processing falls more slowly than other techniques for the range of atom counts of interest for large-scale MD applications.

Figure 9:
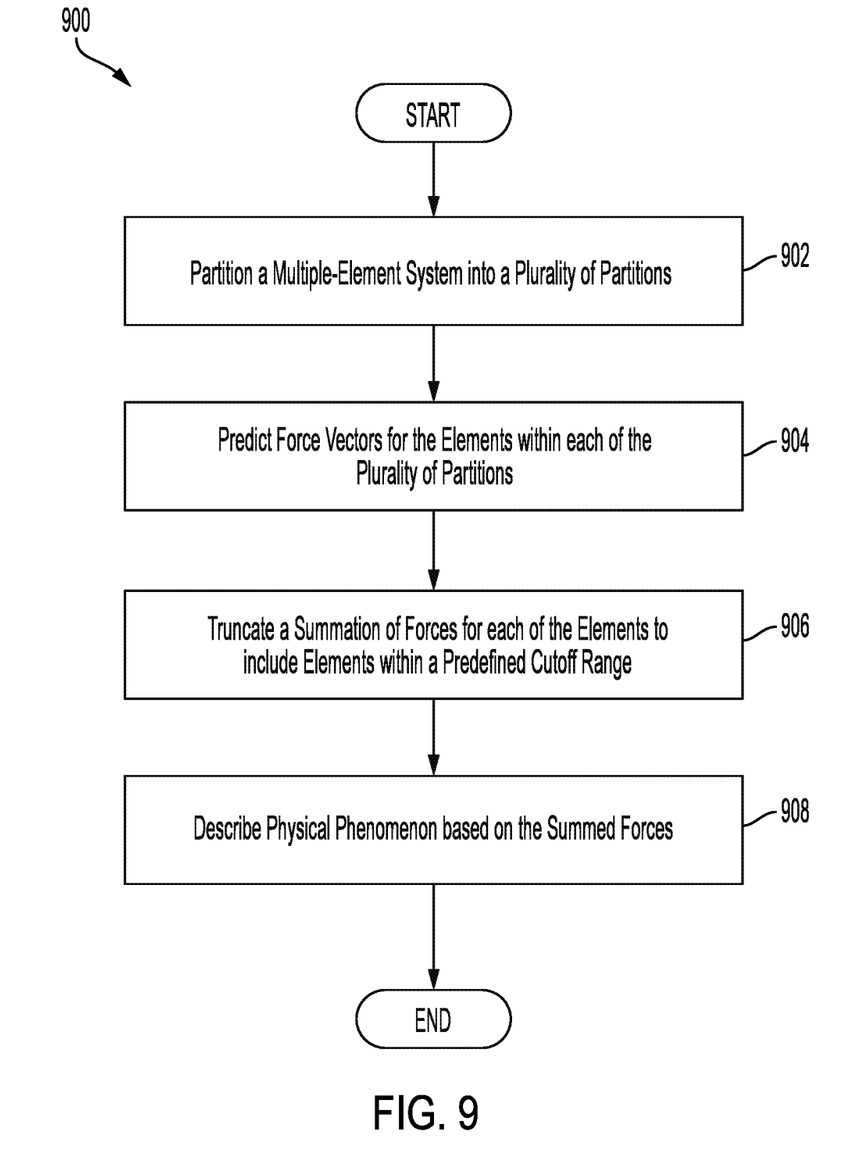
FIG. 9 illustrates an example process for element simulation using a machine learning system parallelized across a plurality of CPUs.

FIG. 9 illustrates an example process 900 for element simulation using a machine learning system parallelized across a plurality of CPUs. For instance, a computational system for element simulation may utilize a plurality of processing nodes, where each node includes a memory storing instructions of a GNN algorithm of molecular dynamics (MD) software and a processor programmed to execute the instructions. The instructions may cause the system to perform the operations of the process 900 in accordance with the approach described above.

At operation 902, a multi-element system is partitioned into a plurality of partitions. Each partition includes a subset of real elements included within the partition and ghost elements outside the partition influencing the real elements. An example partitioning is shown above with respect to FIG. 3.

At operation 904, for each processor of the plurality of processors, force vectors are predicted for the real elements of one of the partitions of the multi-element system. The prediction may be performed by making a backward pass through a GNN having multiple layers. The predicting may include adjusting neighbor distance separately for each of the multiple layers of the GNN. The adjusting neighbor distance for each layer of the multiple layers may include considering an increased amount of neighbor elements as depth of the layer within the GNN increases. For instance, a first layer of the multiple layers may consider edges within a first distance to the real elements and a second, deeper of the multiple layers may consider edges within a second distance to the real elements, with the second distance being greater than the first distance. In another example, a first layer of the multiple layers may consider a first quantity of closest nearest neighbors to the real elements and a second, deeper of the multiple layers may consider a second quantity of closest nearest neighbors to the real elements, the second quantity being greater than the first quantity.

At operation 906, a physical phenomenon is described based on the force vectors. For instance, the resultant forces on the elements of the overall system may be used to describe ionic transport, chemical reactions, and/or material bulk and surface degradation in material systems, such as, devices or functional materials. Non-limiting examples of such material systems include fuel cells, surface coatings, batteries, water desalination, and water filtration. After operation 906, the process 900 ends.

Figure 10:
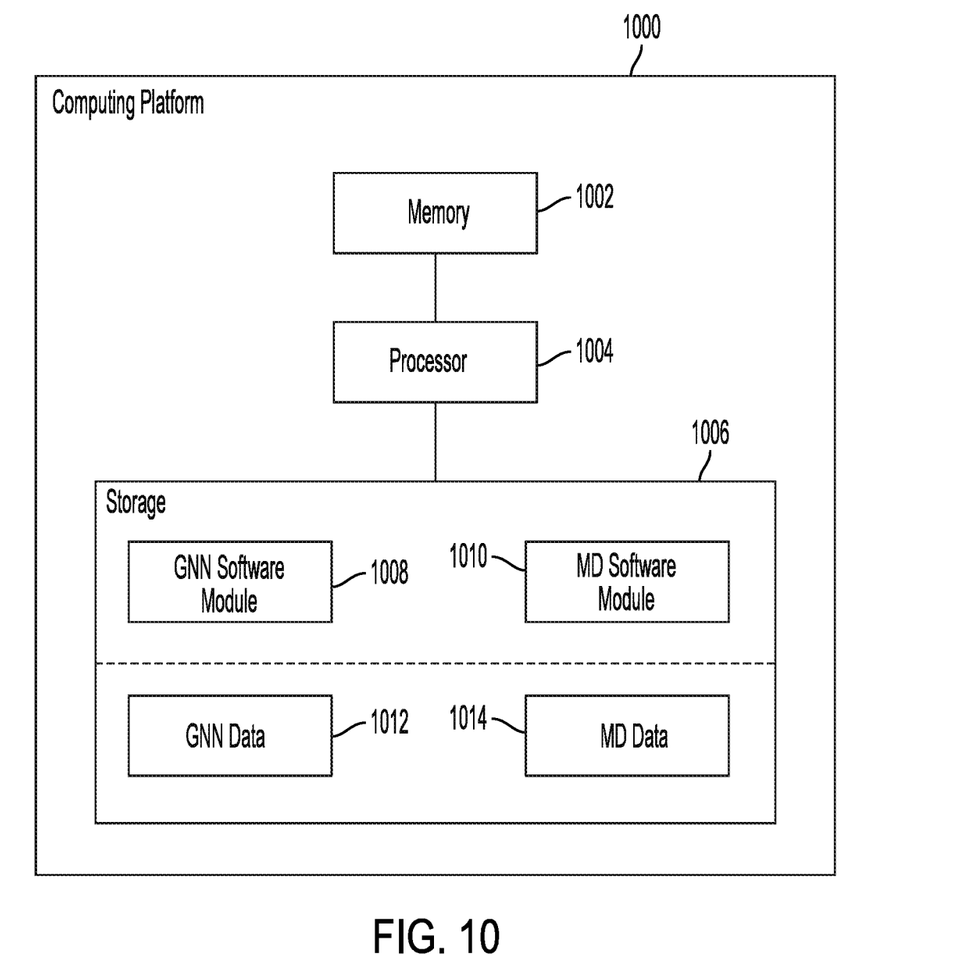
FIG. 10 illustrates an example computing node for use in the performance of element simulation using a machine learning system parallelized across a plurality of CPUs.

The GNN algorithms and/or methodologies of one or more embodiments are implemented using a computing platform, such as the computing platform 1000 illustrated in FIG. 10. The computing platform 1000 may include memory 1002, processor 1004, and non-volatile storage 1006. The processor 1004 may include one or more devices selected from high-performance computing (HPC) systems including high-performance cores, microprocessors, micro-controllers, digital signal processors, microcomputers, central processing units (CPU), graphical processing units (GPU), tensor processing units (TPU), field programmable gate arrays, programmable logic devices, state machines, logic circuits, analog circuits, digital circuits, or any other devices that manipulate signals (analog or digital) based on computer-executable instructions residing in memory 1002. The memory 1002 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information. The non-volatile storage 1006 may include one or more persistent data storage devices such as a hard drive, optical drive, tape drive, non-volatile solid state device, cloud storage or any other device capable of persistently storing information.

The processor 1004 may be configured to read into memory 1002 and execute computer-executable instructions residing in GNN software module 1008 of the non-volatile storage 1006 and embodying GNN algorithms and/or methodologies of one or more embodiments. The processor 1004 may be further configured to read into memory 1002 and execute computer-executable instructions residing in MD software module 1010 (such as LAMMPS) of the non-volatile storage 1006 and embodying MD algorithms and/or methodologies. The software modules 1008 and 1010 may include operating systems and applications. The software modules 1008 and 1010 may be compiled or interpreted from computer programs created using a variety of programming languages and/or technologies, including, without limitation, and either alone or in combination, Java, C, C++, C#, Objective C, Fortran, Pascal, Java Script, Python, Perl, and PL/SQL. In one embodiment, PyTorch, which is a package for the Python programming language, may be used to implement code for the GNNs of one or more embodiments. In another embodiment, PyTorch XLA or TensorFlow, which are both also packages for Python programming language, may be used to implement code for the GNNs of one or more embodiments. The code framework may be based on a crystal graph convolutional neural network (CGCNN) code, which is available under license from the Massachusetts Institute of Technology of Cambridge, Mass.

Upon execution by the processor 1004, the computer-executable instructions of the GNN software module 1008 and the MD software module 1010 may cause the computing platform 1000 to implement one or more of the GNN algorithms and/or methodologies and MD algorithms and/or methodologies, respectively, disclosed herein. The non-volatile storage 1006 may also include GNN data 1012 and MD data 1014 supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

While all of the invention has been illustrated by a description of various embodiments and while these embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the general inventive concept.

What is claimed is:

1. A computational method for element simulation using a machine learning system parallelized across a plurality of processors, the method comprising:
    partitioning a multi-element system into a plurality of partitions, each partition including a subset of real elements included within the partition and ghost elements outside the partition influencing the real elements;
    for each processor of the plurality of processors, predicting force vectors for the real elements within the multi-element system through a graph neural network, GNN having multiple layers and parallelized across multiple processors, the predicting including adjusting neighbor distance separately for each of the multiple layers of the GNN; and
    describing a physical phenomenon based on the force vectors.

2. The method of claim 1, wherein adjusting the neighbor distance for each layer of the multiple layers includes considering an increasing amount of neighbor elements as depth of the layer within the GNN increases.

3. The method of claim 2, wherein a first layer of the multiple layers considers edges within a first distance to the real elements and a second layer, deeper in the multiple layers than the first layer, considers edges within a second distance to the real elements, the second distance being greater than the first distance.

4. The method of claim 3, wherein the elements are atoms, and the edges are bonds between the atoms.

5. The method of claim 2, wherein a first layer of the multiple layers considers a first quantity of closest nearest neighbors to the real elements and a second layer, deeper in the multiple layers than the first layer, considers a second quantity of closest nearest neighbors to the real elements, the second quantity being greater than the first quantity.

6. The method of claim 1, further comprising truncating a summation of forces for each of the real elements to include only those elements that are within a predefined cutoff distance of the respective real element.

7. The method of claim 1, further comprising truncating a summation of forces for each of the real elements to include only those elements that are within a predefined cutoff maximum quantity of nearest neighbors of the respective real element.

8. The method of claim 1, further comprising training the GNN as a deep neural network using a loss function formed to compare the force predictions to ground truth forces on a labeled dataset, such that network weights of the GNN are optimized with respect to the loss function using gradient descent.

9. A computational system for element simulation using a machine learning system parallelized across a plurality of processors, the system comprising:
 a plurality of processing nodes, each node including a memory storing instructions of a graph neural network, GNN, algorithm of molecular dynamics, MD, software and a processor programmed to execute the instructions to perform operations including to:
  operate on one of a plurality of partitions, each partition including a subset of real elements included within the partition and ghost elements outside the partition influencing the real elements;
  predict force vectors for the subset of real elements included within the partition by making a backward pass through the GNN having multiple layers and parallelized across the plurality of processing nodes, the predict operation including to adjust neighbor distance separately for each of the multiple layers of the GNN; and
  describe a physical phenomenon based on a combination of the force vectors from the plurality of processing nodes.

10. The system of claim 9, wherein adjusting the neighbor distance for each layer of the multiple layers includes considering an increasing amount of neighbor elements as depth of the layer within the GNN increases.

11. The system of claim 10, wherein a first layer of the multiple layers considers edges within a first distance to the real elements and a second layer, deeper in the multiple layers than the first layer, considers edges within a second distance to the real elements, the second distance being greater than the first distance.

12. The system of claim 11, wherein the elements are atoms, and the edges are bonds between the atoms.

13. The system of claim 10, wherein a first layer of the multiple layers considers a first quantity of closest nearest neighbors to the real elements and a second layer, deeper in the multiple layers than the first layer, considers a second quantity of closest nearest neighbors to the real elements, the second quantity being greater than the first quantity.

14. The system of claim 9, further comprising truncating a summation of forces for each of the real elements to include only those elements that are within a predefined cutoff distance of the respective real element.

15. The system of claim 9, further comprising truncating a summation of forces for each of the real elements to include only those elements that are within a predefined cutoff maximum quantity of nearest neighbors of the respective real element.

16. A non-transitory computer-readable medium comprising instructions that, when executed by a plurality of processing nodes of a parallelized machine learning system, cause the system to perform operations including to:
 operate on one of a plurality of partitions, each partition including a subset of real elements included within the partition and ghost elements outside the partition influencing the real elements;
 predict force vectors for the subset of real elements included within the partition by making a backward pass through a graph neural network, GNN, having multiple layers and parallelized across the plurality of processing nodes, the predict operation including to adjust neighbor distance separately for each of the multiple layers of the GNN; and
 describe a physical phenomenon based on a combination of the force vectors from the plurality of processing nodes.

17. The medium of claim 16, wherein to adjust the neighbor distance for each layer of the multiple layers includes to consider an increasing amount of neighbor elements as depth of the layer within the GNN increases, wherein one or more of:
 a first layer of the multiple layers considers edges within a first distance to the real elements and a second layer, deeper in the multiple layers than the first layer, considers edges within a second distance to the real elements, the second distance being greater than the first distance; or
 a first layer of the multiple layers considers a first quantity of closest nearest neighbors to the real elements and a second layer, deeper in the multiple layers than the first layer, considers a second quantity of closest nearest neighbors to the real elements, the second quantity being greater than the first quantity.

18. The medium of claim 16, further comprising instructions that, when executed by the plurality of processing nodes of the parallelized machine learning system, cause the system to perform operations including to truncate a summation of forces for each of the real elements to include only those elements that are within a predefined cutoff distance of the respective real element.

19. The medium of claim 16, further comprising instructions that, when executed by the plurality of processing nodes of the parallelized machine learning system, cause the system to perform operations including to truncate a summation of forces for each of the real elements to include only those elements that are within a predefined cutoff maximum quantity of nearest neighbors of the respective real element.

* * * * *